United States Patent
Kobayashi

(10) Patent No.: US 8,301,279 B2
(45) Date of Patent: Oct. 30, 2012

(54) SIGNAL PROCESSING APPARATUS, SIGNAL PROCESSING METHOD, AND PROGRAM THEREFOR

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1062 days.

(21) Appl. No.: 12/245,067

(22) Filed: Oct. 3, 2008

(65) Prior Publication Data

US 2009/0093896 A1 Apr. 9, 2009

(30) Foreign Application Priority Data

Oct. 5, 2007 (JP) ................ P2007-261600

(51) Int. Cl.
*G06F 17/00* (2006.01)
(52) U.S. Cl. .......... 700/94; 704/267; 704/268; 704/269; 702/66; 702/70; 702/190
(58) Field of Classification Search ............ 700/94
See application file for complete search history.

(56) References Cited

U.S. PATENT DOCUMENTS

| | | | | |
|---|---|---|---|---|
| 5,744,742 A | * | 4/1998 | Lindemann et al. | 84/623 |
| 6,608,803 B2 | * | 8/2003 | Inoue et al. | 369/47.23 |
| 2005/0211072 A1 | * | 9/2005 | Lu et al. | 84/612 |
| 2005/0211077 A1 | * | 9/2005 | Kobayashi | 84/661 |
| 2005/0228518 A1 | * | 10/2005 | Watts | 700/94 |
| 2005/0241465 A1 | * | 11/2005 | Goto | 84/616 |
| 2008/0053295 A1 | * | 3/2008 | Goto et al. | 84/616 |

FOREIGN PATENT DOCUMENTS

JP 2005-275068 10/2005

OTHER PUBLICATIONS

Jehan: Perceptral Synthesis Engine: copyright 2001.*
Goto: Real-time music-scene-description: copyright 2002.*

* cited by examiner

*Primary Examiner* — Paul McCord
(74) *Attorney, Agent, or Firm* — Finnegan, Henderson, Farabow, Garrett & Dunner, L.L.P.

(57) ABSTRACT

A signal processing apparatus subjects an audio signal to musical pitch analysis using different analysis techniques for the higher and lower frequencies. When an audio signal is input, a first extractor extracts a high-frequency signal, and a second extractor extracts a low-frequency signal from the audio signal. A high-frequency processor extracts pitch components from the high-frequency signal by applying the short-time Fourier transform. A low-frequency processor extracts pitch components from the low-frequency signal by dividing the low-frequency signal into a plurality of octave components. A synthesizing unit then combines the pitch components thus extracted from the high-frequency signal and the low-frequency signal and outputs the analysis result.

20 Claims, 12 Drawing Sheets

SIGNAL PROCESSING APPARATUS, SIGNAL PROCESSING METHOD, AND PROGRAM THEREFOR

CROSS REFERENCES TO RELATED APPLICATIONS

The present invention contains subject matter related to Japanese Patent Application JP 2007-261600 filed in the Japanese Patent Office on Oct. 5, 2007, the entire contents of which are incorporated herein by reference.

BACKGROUND OF THE INVENTION

1. Field of the Invention

The present invention relates to a signal processing apparatus, a signal processing method, and a program therefor. More particularly, the present invention relates to a signal processing apparatus, signal processing method, and program suitable for use in the decomposition of an audio signal into its respective pitch components.

2. Description of the Related Art

In the past, a number of musical pitch analysis techniques have been proposed for use in automatic notation, wherein a musical score is automatically generated according to an input audio signal, or for use in the detection of the musical characteristics of an input audio signal.

Musical pitch analysis is a type of processing whereby a digital audio (i.e., musical) signal sampled at a given sampling frequency is analyzed by decomposition into information about each musical pitch C, C#, D, D#, E, F, F#, G, G#, A, A#, and B corresponding to the solfège syllables (do re mi, etc.).

The twelve musical pitches C, C#, D, D#, E, F, F#, G, G#, A, A#, and B constitute a single octave. Hereinafter, octaves are designated octave O1, O2, O3, etc., in order from low (i.e., low-frequency) octaves to high (i.e., high-frequency) octaves. In addition, the pitch C of octave O1 is designated C1, while the pitch A# of octave O2 is designated A#2, for example.

The pitches of a given octave are related to the pitches of lower octaves in that the pitches of the given octave are multiples of the pitches of the lower octaves. In other words, pitches are distributed logarithmically (or exponentially) with respect to frequency. For example, if the pitch A3 (being the pitch A of the octave O3) is taken to have a frequency (i.e., a center frequency) of 440 Hz, then the pitch A4 (being the pitch A of the octave O4) has a frequency that is double 440 Hz, and thus 880 Hz. Furthermore, the difference in frequency (i.e., center frequency) between adjacent pitches such as C and C# increases with higher octaves. For example, in the low octave O2 (127.1 Hz to 254.2 Hz), the difference between C2 and C#2 is approximately 6 Hz, while in the high octave O6, the difference between C6 and C#6 is approximately 123 Hz.

Moreover, the respective frequency bands (i.e., the bandwidths) for each pitch in a given octave are twice that of the frequency bands for the corresponding pitches in the next lower octave.

Established techniques for musical pitch analysis of audio signals include techniques using the short-time Fourier transform (hereinafter referred to as STFT techniques) as well as techniques using wavelet transforms (hereinafter referred to as wavelet transform techniques). In addition, there also exist techniques like that proposed in the present application, which use octave division and band pass filtering (hereinafter referred to as octave division techniques). (See JP-A-2005-275068, for example).

STFT techniques analyze the frequency components of an audio signal using equally-spaced frequency bands. For this reason, there is a tendency for the analysis to be less precise at low frequencies, due to the fact that pitches are distributed logarithmically with respect to frequency, as described above.

With wavelet transform techniques, it is possible to estimate pitch with an ideal time resolution and frequency resolution by using a basis function able to extract one-twelfth of an octave (i.e., a single musical pitch). However, wavelet transform techniques involve computation of vast complexity.

In contrast, with octave division techniques, it is possible to conduct musical pitch analysis without reduced precision at low frequencies, and furthermore with reduced computational complexity compared to that of wavelet transform techniques.

SUMMARY OF THE INVENTION

In the musical pitch analysis methods of the related art, musical pitch analysis of audio signals has been primarily focused on low frequencies, without major consideration for musical pitch analysis of high frequencies. However, in recent years there has been a tendency for musical pitch analysis to also focus on high frequencies.

However, while octave division techniques are superior with respect to STFT techniques and wavelet techniques at low frequencies, as described above, that superiority with respect to STFT techniques and wavelet techniques is lost at high frequencies.

Consequently, there is a desire to realize a technique whereby both the high frequencies and the low frequencies of an audio signal can be efficiently analyzed for musical pitches.

The present invention, being devised in light of the above circumstances, is able to efficiently analyze an audio signal for pitches at both the high frequencies and the low frequencies of the audio signal.

A signal processing apparatus in accordance with an embodiment of the present invention analyzes an audio signal, and is provided with: first extracting means for extracting a high-frequency signal containing the higher frequencies from an input audio signal; second extracting means for extracting a low-frequency signal containing the lower frequencies from an input audio signal; high-frequency processing means for analyzing the plurality of pitch components contained in the high-frequency signal that was extracted from the audio signal, the analysis being conducted using the short-time Fourier transform; low-frequency processing means for analyzing the plurality of pitch components contained in the low-frequency signal that was extracted from the audio signal, the analysis being conducted by first dividing the low-frequency signal into a plurality of octave components, and then extracting the plurality of pitch components from the respective octave components; and synthesizing means for combining the plurality of pitch components contained in the analyzed high-frequency signal with the plurality of pitch components contained in the analyzed low-frequency signal.

The high-frequency processing means may be configured to include: STFT means for acquiring equally-spaced frequency band components by analyzing the high-frequency signal extracted from the audio signal using the short-time Fourier transform; and summing means for analyzing the plurality of pitch components contained in the divided high-frequency signal by summing the energies of the plurality of frequency bands that constitute a respective pitch.

The low-frequency processing means may be configured to include: octave division means for dividing the low-frequency signal extracted from the audio signal into a plurality of octave components by repeatedly dividing the low-frequency signal extracted from the audio signal further into a high-frequency component containing the higher frequencies and a low-frequency component containing the lower frequencies, and then respectively downsampling the high-frequency component and the low-frequency component; and filtering means for extracting a plurality of pitch components by respectively filtering each octave component in the plurality of octave components.

The low-frequency processing means may also be configured to further include: resampling means for resampling the low-frequency signal extracted from the audio signal.

A signal processing method in accordance with another embodiment of the present invention is for a signal processing apparatus that analyzes an audio signal, and includes the steps of: extracting a high-frequency signal containing the higher frequencies from an input audio signal; extracting a low-frequency signal containing the lower frequencies from an input audio signal; analyzing the plurality of pitch components contained in the high-frequency signal that was extracted from the audio signal, the analysis being conducted using the short-time Fourier transform; analyzing the plurality of pitch components contained in the low-frequency signal that was extracted from the audio signal, the analysis being conducted by first dividing the low-frequency signal into a plurality of octave components, and then extracting the plurality of pitch components from the respective octave components; and combining the plurality of pitch components contained in the analyzed high-frequency signal with the plurality of pitch components contained in the analyzed low-frequency signal.

A program in accordance with another embodiment of the present invention is for controlling a signal processing apparatus that analyzes an audio signal, and causes a computer of the signal processing apparatus to execute processing that includes the steps of: extracting a high-frequency signal containing the higher frequencies from an input audio signal; extracting a low-frequency signal containing the lower frequencies from an input audio signal; analyzing the plurality of pitch components contained in the high-frequency signal that was extracted from the audio signal, the analysis being conducted using the short-time Fourier transform; analyzing the plurality of pitch components contained in the low-frequency signal that was extracted from the audio signal, the analysis being conducted by first dividing the low-frequency signal into a plurality of octave components, and then extracting the plurality of pitch components from the respective octave components; and combining the plurality of pitch components contained in the analyzed high-frequency signal with the plurality of pitch components contained in the analyzed low-frequency signal.

In an embodiment of the present invention, a high-frequency signal and a low-frequency signal are extracted from an input audio signal, the high-frequency signal containing the higher frequencies of the audio signal, and the low-frequency signal containing the lower frequencies of the audio signal. The extracted high-frequency signal is then analyzed by decomposition into the plurality of pitch components contained therein using the short-time Fourier transform. In addition, the extracted low-frequency signal is analyzed by decomposition into the plurality of pitch components contained therein by dividing the low-frequency signal into a plurality of octave components and then extracting a plurality of pitch components from each octave component. Subsequently, the plurality of pitch components contained in the analyzed high-frequency signal is combined with the plurality of pitch components contained in the analyzed low-frequency signal.

According to an embodiment of the present embodiment, both the higher frequencies and the lower frequencies of an audio signal are efficiently analyzed for pitch.

DESCRIPTION OF THE PREFERRED EMBODIMENTS

Figure 1:
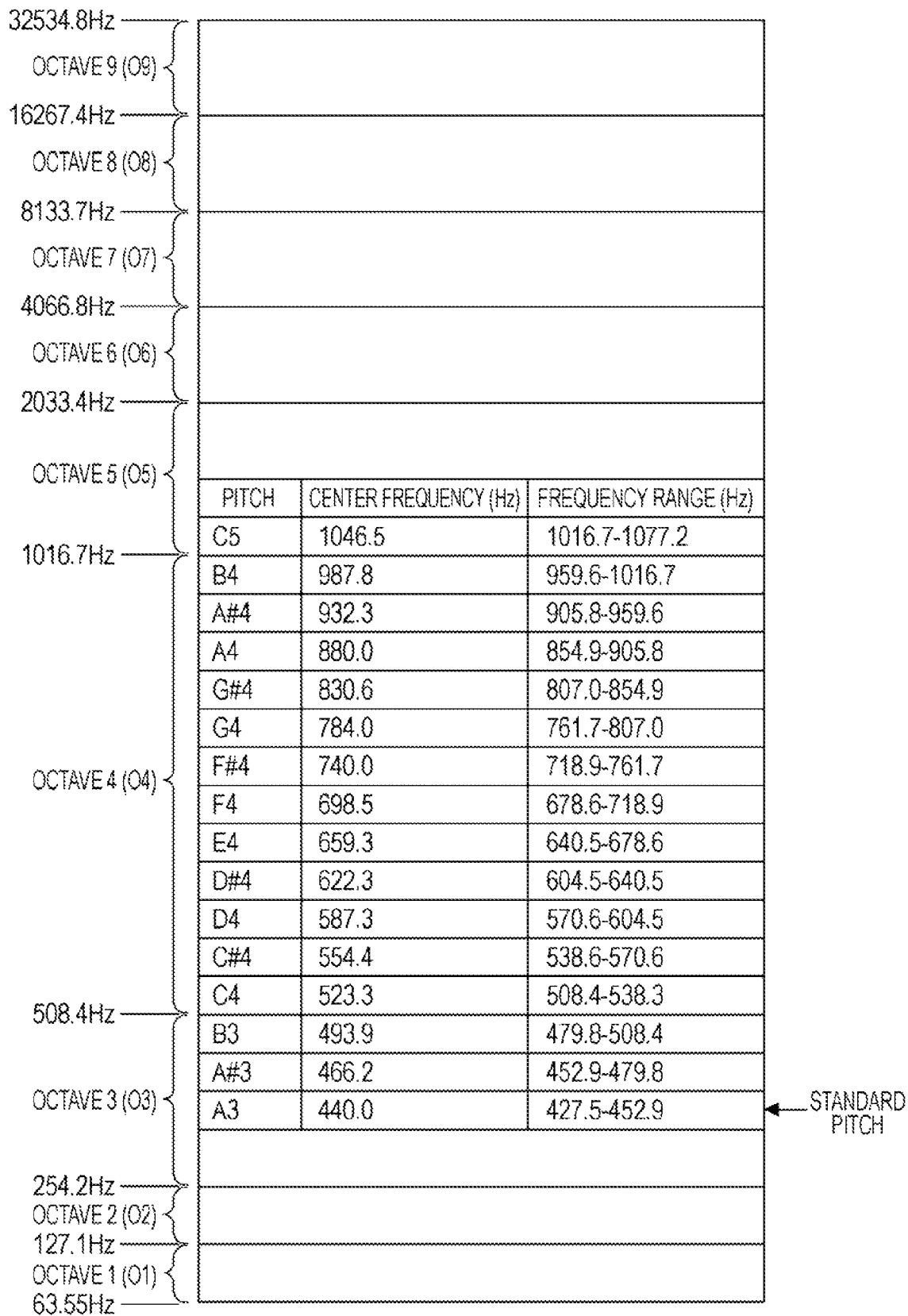
FIG. 1 is a diagram for explaining the relationship between the octaves, pitches, and frequencies of an audio signal.

Hereinafter, an audio signal analyzing device in accordance with an embodiment of the present invention will be described. Before that, however, an audio signal to be processed by the audio signal analyzing device will be described with reference to FIG. 1. FIG. 1 illustrates the relationship between the pitches and the frequencies of an audio signal.

As shown in FIG. 1, an audio signal to be processed contains frequency components in the range of 63.55 Hz to 32534.8 Hz. These frequency components are separated into nine octaves numbered O1 to O9 in order from the low-frequency side. Each octave is taken to contain the 12 pitches C, C#, D, D#, E, F, F#, G, G#, A, A#, and B, arranged in that order from low frequency to high frequency.

The 12 pitches C, C#, D, D#, E, F, F#, G, G#, A, A#, and B of octave O1 (also referred to as the 12 pitches from C to B hereinafter) are respectively designated C1, C#1, D1, D#1, E1, F1, F#1, G1, G#1, A1, A#1, and B1 (also referred to as the 12 pitches from C1 to B1 hereinafter). The pitches of octaves O2 to O9 are similarly designated.

In FIG. 1, the frequencies of the 12 pitches in each octave are determined by taking the pitch A of octave O3 (i.e., the pitch A3) as a standard pitch having a frequency (i.e., a center frequency) of 440 Hz.

More specifically, since the pitches are distributed logarithmically with respect to frequency, separating a single octave into 12 pitches results in the ratio of the frequencies (i.e., the center frequencies) of adjacent pitches being $1:^{12}\sqrt{2}$ (i.e., the twelfth root of 2). In addition, the ratio of the frequency ranges of adjacent pitches also becomes $1:^{12}\sqrt{2}$.

For example, as shown in FIG. 1, the next highest pitch after A3 of octave 3 is A#3, and thus the frequency (i.e., the center frequency) of A#3 becomes 440.0 (the frequency of A3) multiplied by $^{12}\sqrt{2}$; or 466.2 Hz. Likewise, the next highest pitch after A#3 is B3, and thus the frequency of B3 becomes A#3 multiplied by $^{12}\sqrt{2}$, or 493.9 Hz. The frequencies of the other pitches are similarly determined on the basis of the standard pitch.

Additionally, since a single octave is delimited by each repetition of the 12 pitches from C to B, the frequency range of a single octave extends from the lowest frequency in the frequency range of C to the highest frequency in the frequency range of B. For example, the frequency range of the octave O4 extends from the lowest frequency in the frequency range of C4 to the highest frequency in the frequency range of B4, specifically 508.4 Hz to 1016.7 Hz. As another example, the frequency range of the octave O5 extends from the lowest frequency in the frequency range of C5 to the highest frequency in the frequency range of B5, specifically 1016.7 Hz to 2033.4 Hz. It should be appreciated that in the present specification, a frequency range expressed as X Hz to Y Hz (where X and Y are arbitrary values) is herein taken to mean equal to or greater than X Hz, and less than Y Hz.

It should furthermore be appreciated that, with the exception of the octave O4 and portions of the octaves O3 and O5, the center frequencies and the frequency ranges of the 12 pitches in each respective octave O1 to O9 are not shown in FIG. 1 for the sake of brevity.

Figure 2:
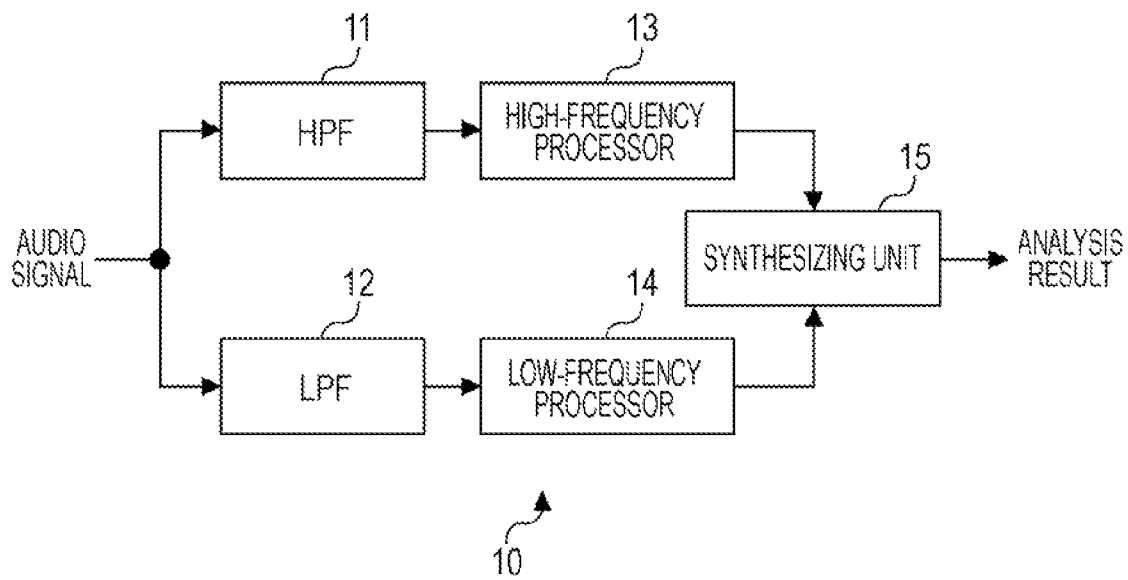
FIG. 2 is a block diagram illustrating an exemplary configuration of an audio signal analyzing device to which the present invention has been applied.

FIG. 2 shows an exemplary configuration of an audio signal analyzing device in accordance with an embodiment of the present invention. The audio signal analyzing device 10 processes an audio signal input as a time-series signal for analysis, thereby decomposing the audio signal into 12 pitches for each octave and computing the energy of each pitch.

The processing results of the audio signal analyzing device 10 may then be used for musical analysis. More specifically, the processing results may be used to analyze musical characteristics of the audio signal, such as melody, chord progression, tempo, and numbers of notes.

The audio signal analyzing device 10 is made up of the following: a high-pass filter (HPF) 11 that extracts a signal (hereinafter referred to as the high-frequency signal) containing the higher frequencies of the input audio signal; a low-pass filter (LPF) 12 that extracts a signal (hereinafter referred to as the low-frequency signal) containing the lower frequencies of the input audio signal; a high-frequency processor 13 that subjects the extracted high-frequency signal to musical pitch analysis using the STFT technique; a low-frequency processor 14 that subjects the extracted low-frequency audio signal to musical pitch analysis using the octave division technique; and a synthesizing unit 15 that combines the musical pitch analysis results from the high-frequency processor 13 with the musical pitch analysis results from the low-frequency processor 14.

The audio signal that is input into the audio signal analyzing device 10 is a signal obtained by sampling audio at a predetermined sampling rate. For example, if an audio signal played back from a CD (compact disc) is input, the sampling frequency of the audio signal is 44.1 kHz.

The high-pass filter 11 extracts, from the input audio signal, a high-frequency signal (such as a signal containing the frequency components equal to or greater than 4066.8 Hz, being the frequency corresponding to the lowest frequency of C7 in the octave O7), and then outputs the extracted high-frequency signal to the high-frequency processor 13.

The low-pass filter 12 extracts, from the input audio signal, a low-frequency signal made up of the frequencies that were not extracted by the high-pass filter 11 (in the present example, a signal containing frequency components less than 4066.8 Hz, being the frequency corresponding to the highest frequency of B6 in the octave O6), and then outputs the extracted low-frequency signal to the low-frequency processor 14.

It should be appreciated that the boundary between the high-frequency signal extracted by the high-pass filter 11 and the low-frequency signal extracted by the low-pass filter 12 is not fixed at the boundary between the octaves O6 and O7 like in the above example, and instead may be varied. For example, while the high-frequency processor 13 to be hereinafter described divides an audio signal into equally-spaced frequency bands using the STFT technique, the boundaries thereof may be determined such that the number of frequency bands contained in a single pitch is not less than a predetermined number. Alternatively, boundaries may be determined according to the processing time or analysis precision ultimately desired.

Figure 3:
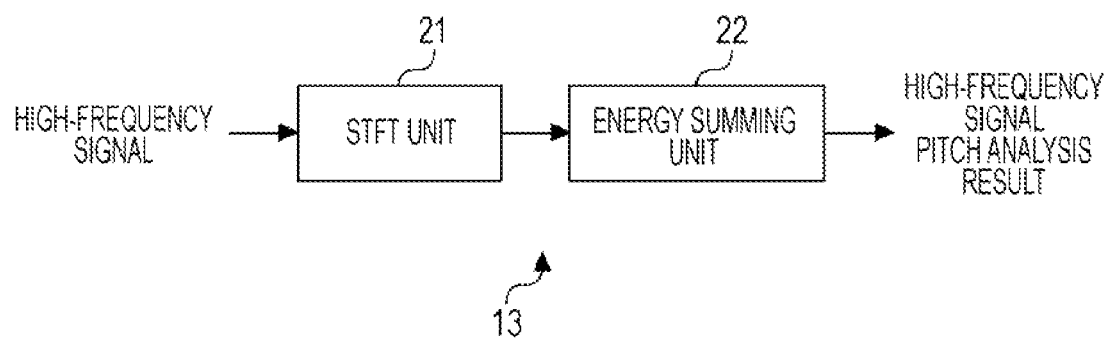
FIG. 3 is a block diagram illustrating an exemplary configuration of the high-frequency processor shown in FIG. 2.

As shown in FIG. 3, the high-frequency processor 13 is made up of a STFT unit 21 that applies the short-time Fourier transform to the high-frequency signal received as input from the high-pass filter 11, as well as an energy summing unit 22 that computes the energy of each pitch by summing the energies of the frequency components contained in a respective pitch.

Figure 4:
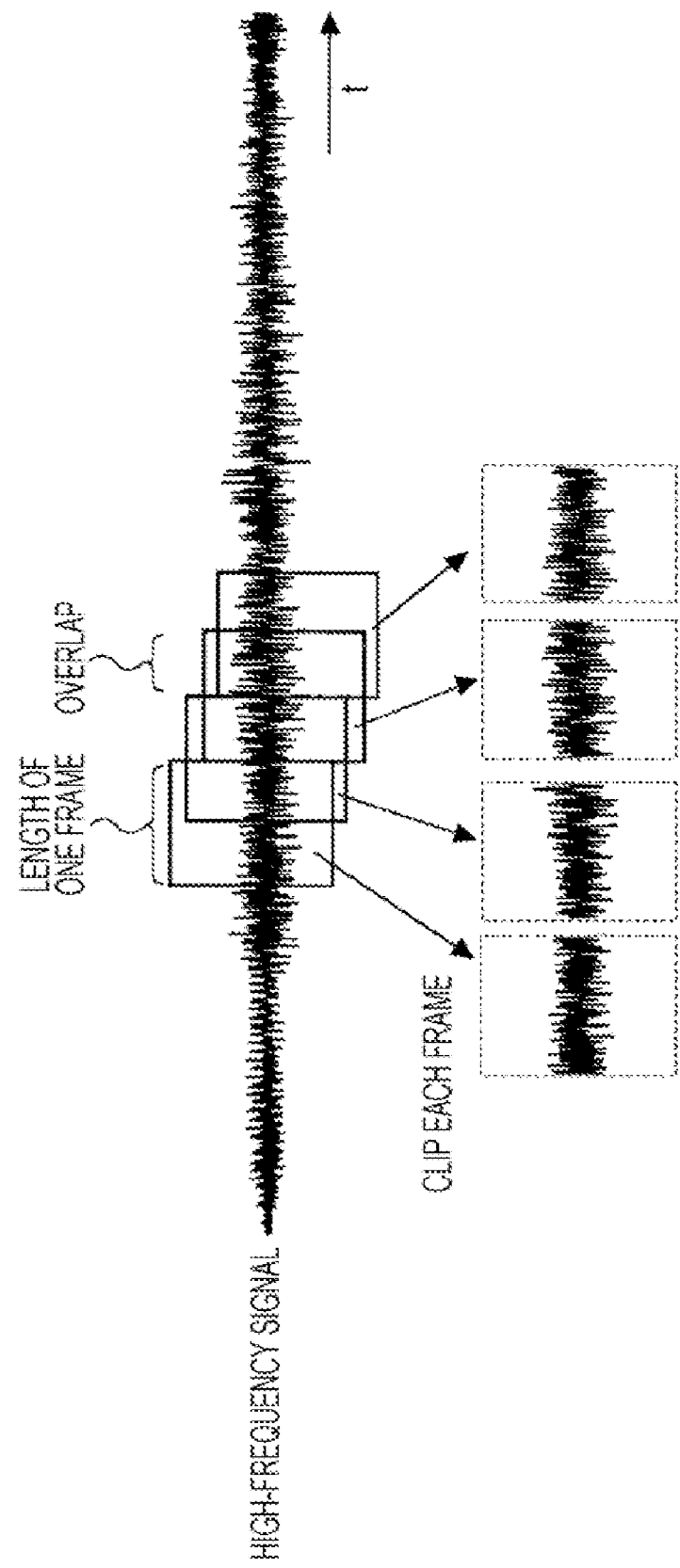
FIG. 4 is a diagram for explaining the processing of the STFT unit shown in FIG. 3.
Figure 5:
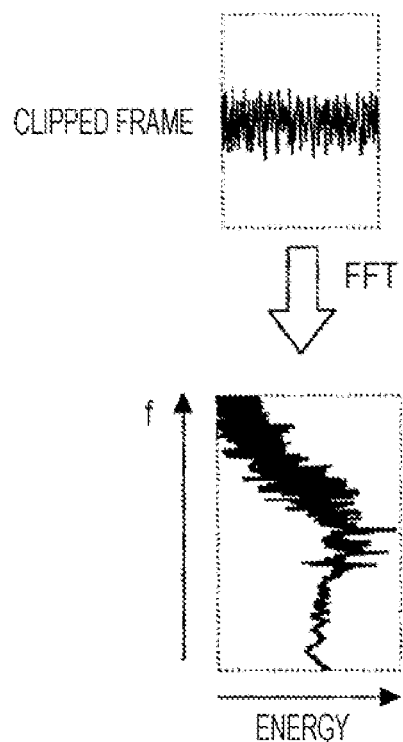
FIG. 5 is a diagram for explaining the processing of the STFT unit shown in FIG. 3.

As shown in FIG. 4, the STFT unit 21 divides the high-frequency signal received as input from the high-pass filter 11 into a plurality of partially overlapping frames having a predetermined duration. Furthermore, as shown in FIG. 5, the STFT unit 21 applies first a window function and then a fast Fourier transform (FFT) to each of the high-frequency signal frames. As a result, the high-frequency signal frames are subdivided into a plurality of equally-spaced frequency bands, and the energy of each frequency band is computed.

Figure 6:
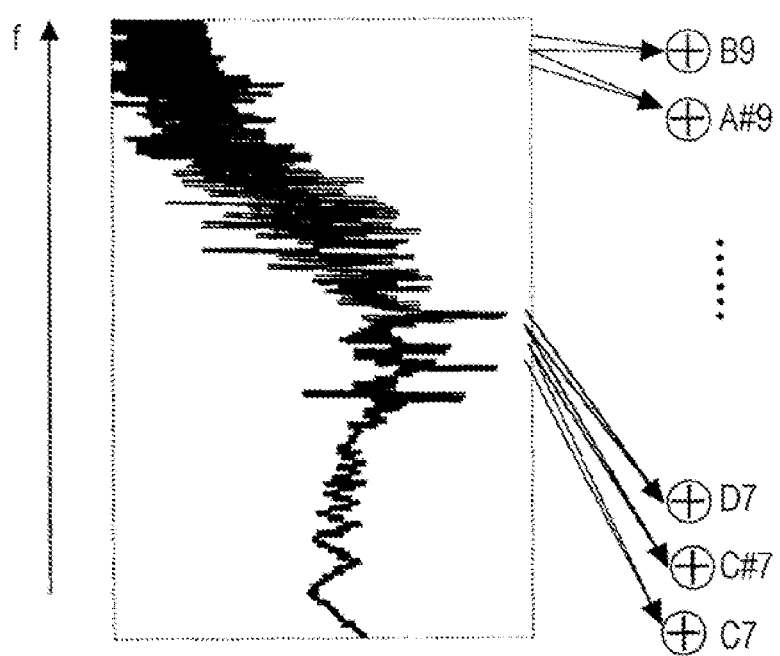
FIG. 6 is a diagram for explaining the processing of the energy summing unit shown in FIG. 3.

As shown in FIG. 6, the energy summing unit 22 computes the energy of each pitch on the basis of the output from the STFT unit 21 by summing the respective energies of the frequency bands contained in each pitch.

Figure 7:
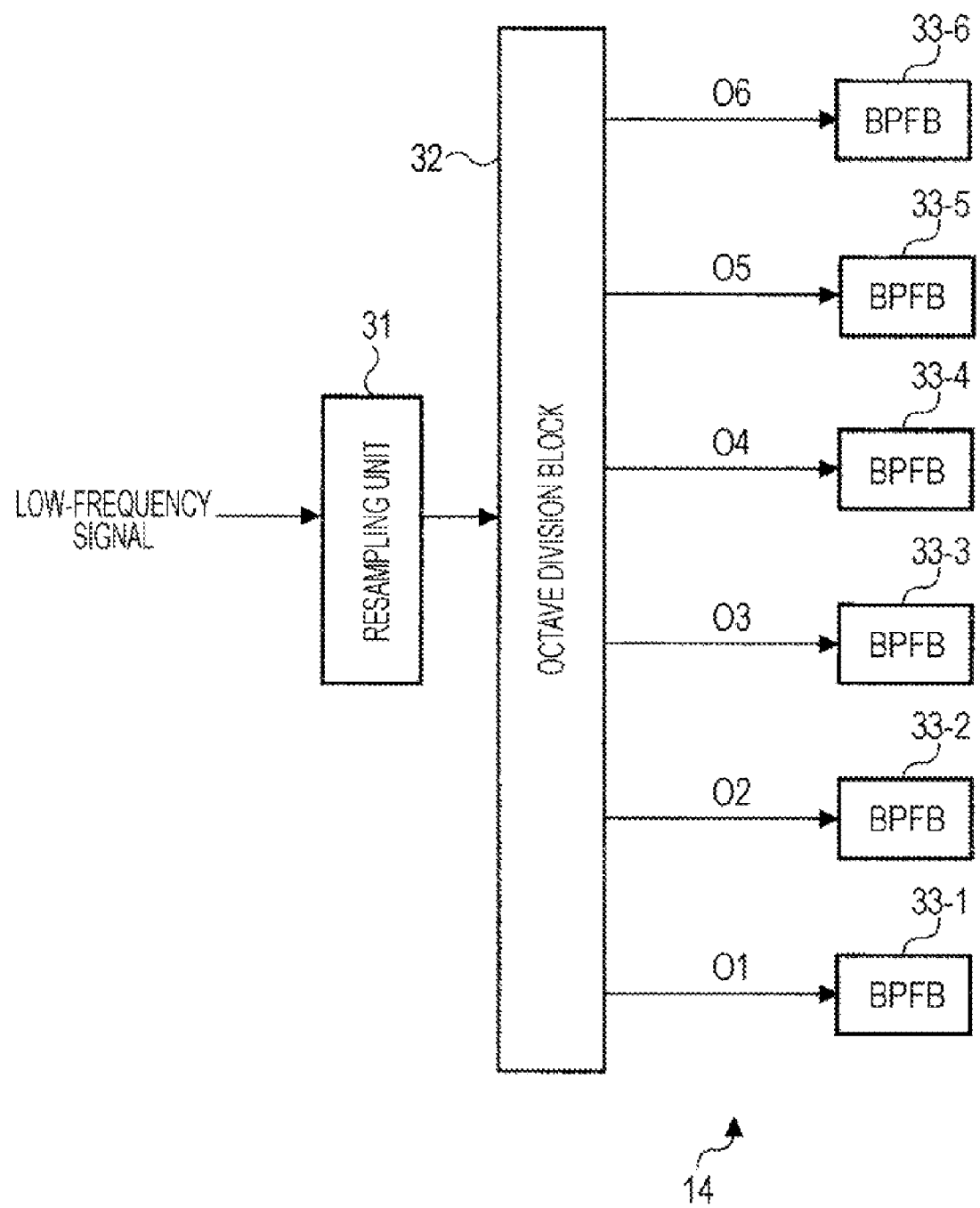
FIG. 7 is a block diagram illustrating an exemplary configuration of the low-frequency processor shown in FIG. 2.

As shown in FIG. 7, the low-frequency processor 14 is made up of a resampling unit 31 that resamples the low-frequency signal received as input from the low-pass filter 12, an octave division block 32 that divides the resampled low-frequency signal into the plurality of octaves from O1 to O6, and band-pass filter blocks (hereinafter, BPFBs) 33-1 to 33-6, which respectively extract the 12 pitches from B to C from the frequency components for each octave.

The resampling unit 31 resamples the low-frequency signal received as input at a predetermined sampling frequency so as to render the low-frequency signal suitable for subsequent processing by the octave division block 32. The resampling unit 31 then outputs the resampled low-frequency signal to the octave division block 32.

The octave division block 32 divides the resampled low-frequency signal received as input from the resampling unit 31 into frequency components for the octaves O1 to O6, and then respectively outputs the frequency components for the octaves O1 to O6 to corresponding BPFBs 33-1 to 33-6. In other words, the octave division block 32 outputs the frequency components for the octave O1 to the BPFB 33-1, and the frequency components for the octave O2 to the BPFB 33-2. The frequency components for the octaves O3 to O6 are similarly output to the remaining BPFBs.

More specifically, in the octave division block 32, the low-frequency signal received as input is further subdivided into a high-frequency component and a low-frequency component. The resulting components are then respectively downsampled to one-half the sampling frequency of the current sampling frequency, and the downsampled results of the high-frequency component are extracted as an audio signal for the octave O6.

Meanwhile, the downsampled results of the low-frequency component are again subdivided into a high-frequency component and a low-frequency component, and then downsampled to one-half the current sampling frequency. The downsampled results of the high-frequency component thus acquired are extracted as an audio signal for the next lowest octave, O5. Audio signals are similarly extracted for the remaining octaves O4 to O1.

In this way, in the octave division block 32, processing is repeatedly conducted to divide a low-frequency signal into a high-frequency component and a low-frequency component and then downsample the resulting components to half the current sampling frequency, thereby extracting an audio signal for each octave. Consequently, the boundary frequency of each octave is given as the value found by dividing the sampling frequency of the audio signal that was input into the octave division block 32 by $2^n$ (n=1, 2, ... ).

Consequently, if it is hypothetically assumed that a resampling unit 31 is not provided and that the low-frequency signal is provided as-is to the octave division block 32 without being resampled, then the following difficulties arise.

For example, if the sampling frequency of the audio signal input into the audio signal analyzing device 10 is 44.1 kHz, then that audio signal will be divided into frequency bands in the octave division block 32, and an audio signal will be extracted as the high-frequency component having a frequency range extending from ((44.1/2)/2) kHz to 44.1/2 kHz. Since the highest and lowest frequencies of the resulting audio signal do not match any of the boundary frequencies for the octaves O1 to O9 shown in FIG. 1, the lower frequencies and/or the higher frequencies of the extracted high-frequency component will either lack portions of the frequency components for pitches in the intended octave, or alternatively, portions of the frequency components for pitches in other, adjacent octaves will be included in the intended octave.

In order to avoid such difficulties, the resampling unit 31 is configured such that a low-frequency signal input thereinto is resampled using the boundary frequency between two predetermined octaves as a basis frequency, wherein the basis frequency is multiplied by a power of two to yield the sampling frequency for resampling.

As a more specific example, if the boundary frequency 1016.7 Hz separating the octaves O4 and O5 is taken to be the basis frequency, then the audio signal is resampled using a new sampling frequency equal to the basis frequency multiplied by $2^5$, or 32534.7 Hz. It should be appreciated that the selection of the boundary frequency that acts as the basis is arbitrary, as is the selection of the power of two. For example, these values may be determined according to which octave containing certain pitches is to be extracted in particular.

The BPFBs 33-1 to 33-6 each include 12 built-in band-pass filters that pass audio signals whose frequencies are in the respective frequency ranges of the 12 pitches from C to B. Thus, when one of the BPFBs 33-1 to 33-6 filters an audio signal for a single octave that is received as input from the octave division block 32, an audio signal containing 12 pitches from C to B is extracted as a result.

For example, the BPFB 33-1 filters the audio signal for the octave O1 that is received as input from the octave division block 32, and thereby extracts signal components for the 12 pitches C1 to B1. As another example, the BPFB 33-2 filters the audio signal for the octave O2 that is received as input from the octave division block 32, and thereby extracts signal components for the 12 pitches C2 to B2. The BPFBs 33-3 to 33-6 operate in a similar manner.

Figure 8:
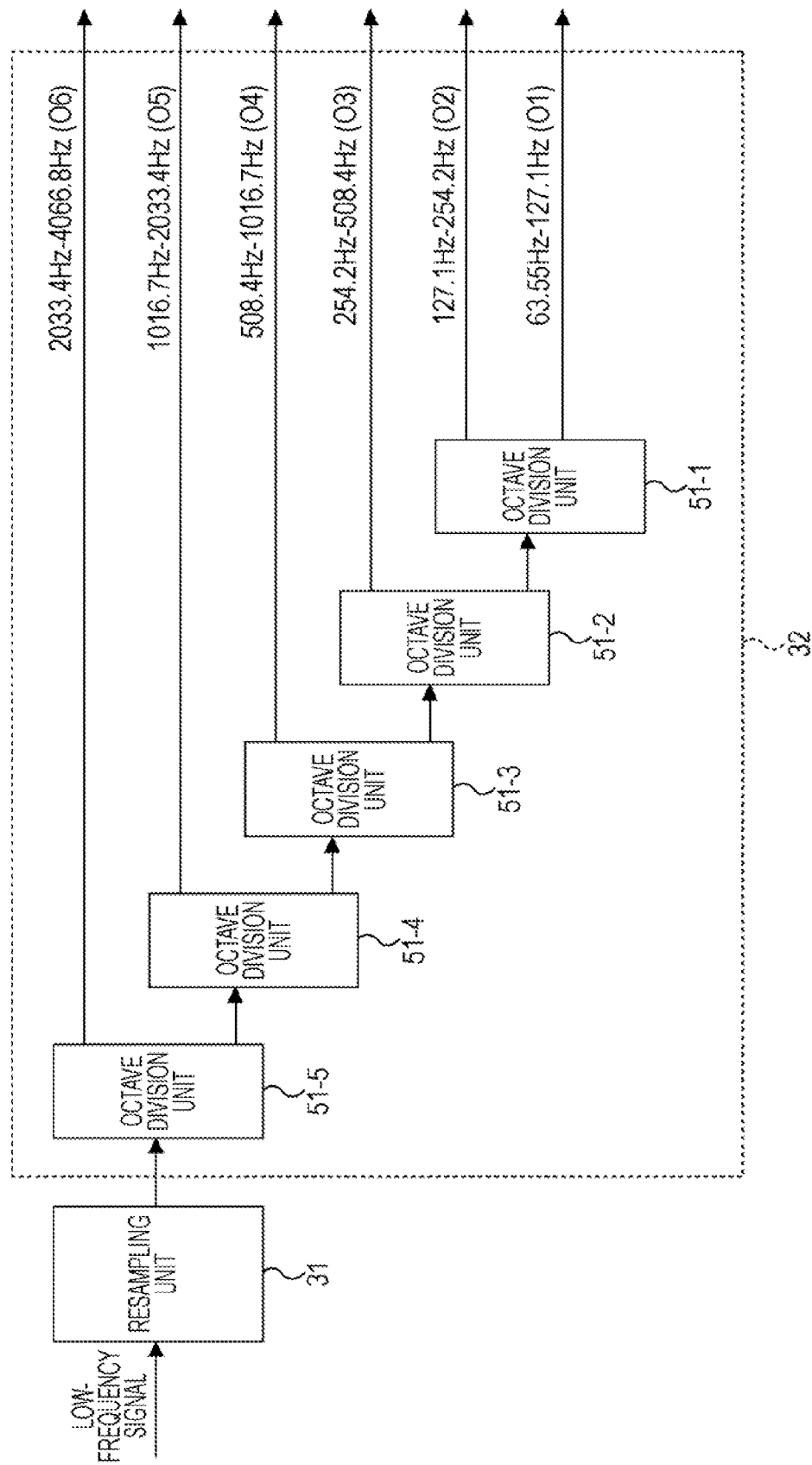
FIG. 8 is a block diagram illustrating an exemplary configuration of the octave division block shown in FIG. 7.
Figure 9:
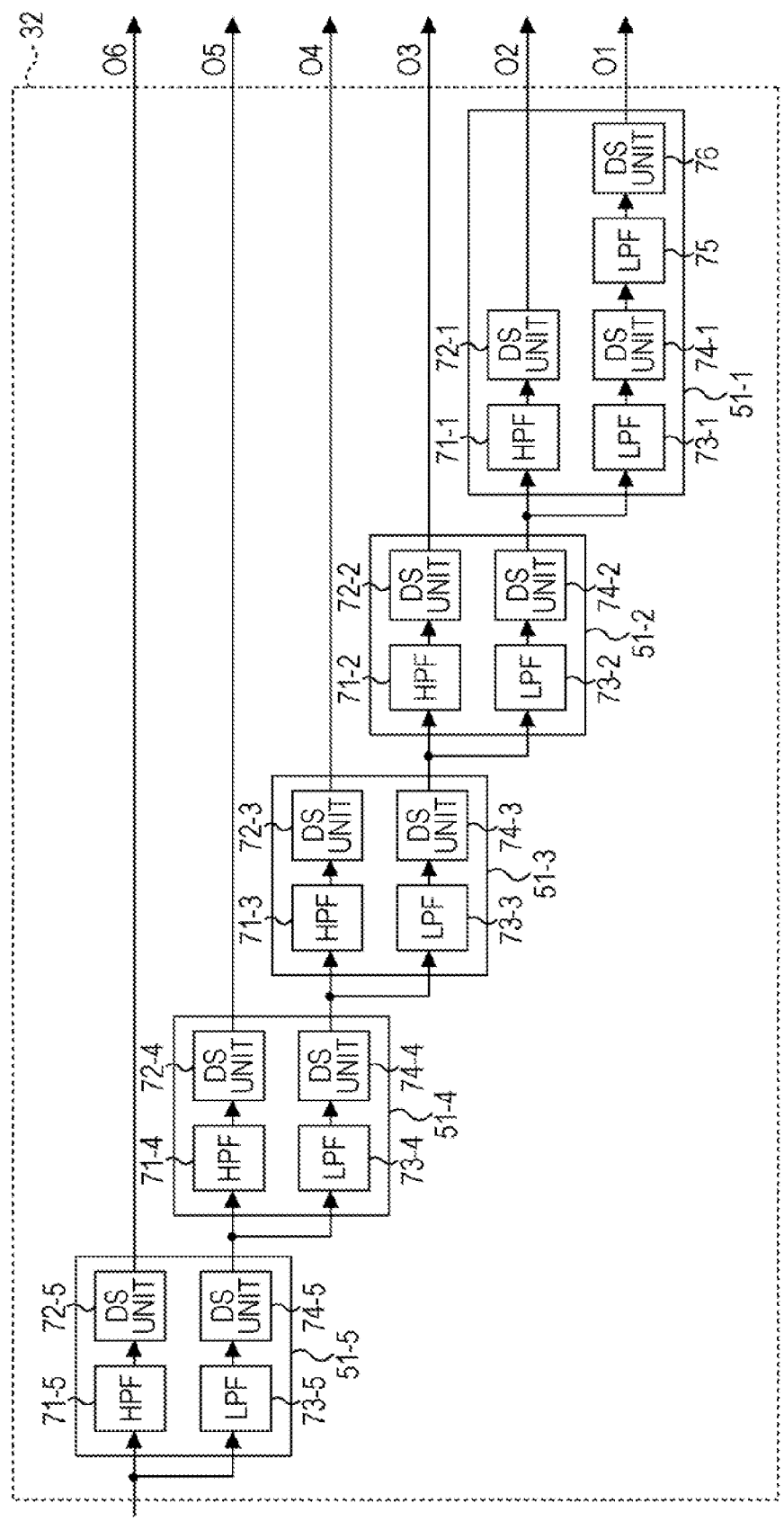
FIG. 9 is a block diagram illustrating an exemplary configuration of the octave division units shown in FIG. 8.

Next, an exemplary configuration of the octave division block 32 will be described in detail with reference to FIGS. 8 and 9. As shown in FIG. 8, the octave division block 32 is made up of octave division units 51-1 to 51-5. Also, as shown in FIG. 9, the octave division unit 51-1 is made up of a high-pass filter (HPF) 71-1, a downsampling (DS) unit 72-1, a low-pass filter (LPF) 73-1, a downsampling unit 74-1, a high-pass filter 75, and a downsampling unit 76. The octave division unit 51-2 is made up of a high-pass filter 72-1, a downsampling unit 72-2, a low-pass filter 73-2, and a downsampling unit 74-2. The octave division units 51-3 to 51-5 are configured similarly to the octave division unit 51-2.

Figure 10:
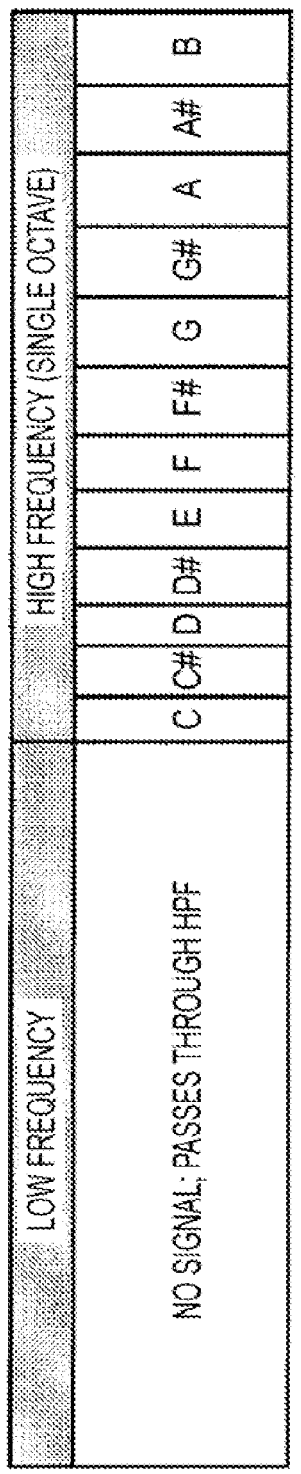
FIG. 10 is a diagram for explaining the processing of the high-pass filters shown in FIG. 9.

More specifically, the octave division unit 51-5 is provided with: a high-pass filter 71-5 that takes an audio signal that has been resampled at a sampling frequency of 32534.7 Hz and received as input from the resampling unit 31, and extracts therefrom a component containing the upper half of the frequency bands (hereinafter referred to as the high-frequency component), as shown in FIG. 10; a downsampling unit 72-5 that downsamples the extracted high-frequency component to one-half the sampling frequency; a low-pass filter 73-5 that takes an audio signal that has been resampled at a sampling frequency of 32534.7 Hz and received as input from the resampling unit 31, and extracts therefrom a component containing the lower half of the frequency bands (hereinafter referred to as the low-frequency component); and a downsampling unit 74-5 that downsamples the extracted low-frequency component to one-half the sampling frequency.

Subsequently, the downsampled high-frequency component that is output from the downsampling unit 72-5 is supplied to the subsequent BPFB 33-6 as the audio signal for the octave O6. In addition, the downsampled low-frequency component that is output from the downsampling unit 74-5 is supplied to the octave division unit 51-4.

Figure 11:
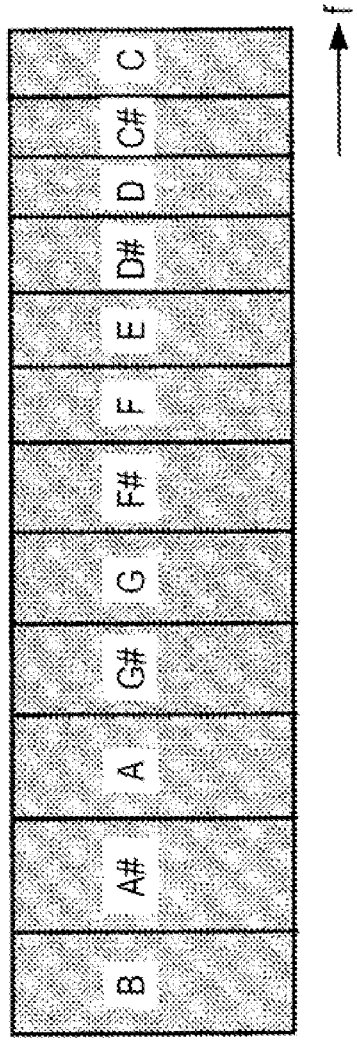
FIG. 11 is a diagram for explaining the processing of the downsampling unit shown in FIG. 9.

It should be appreciated that the high-frequency component, having been extracted by the high-pass filter 51-5 and downsampled to one-half the sampling frequency by the downsampling unit 72-5, is reversed compared to the high-frequency component before downsampling. In other words, the signal components of the pitches contained in the downsampled high-frequency component are arranged on the frequency axis in reverse order compared to the signal components before downsampling (as shown in FIG. 10). Thus, the pitches are arranged in the order B, A#, A, G#, G, F#, F, E, D#, D, C#, and C, as shown in FIG. 11.

The other octave division units 51-$i$ (i=4, 3, 2) are configured similarly to the above. An input audio signal is divided into a high-frequency component and a low-frequency component, these components being respectively downsampled to one-half the sampling frequency. The downsampled high-frequency component is then supplied to a subsequent BPFB 33-($i$+1) as the audio signal for the octave O($i$+1), while the downsampled low-frequency component is supplied to the octave division unit 51-($i$−1).

However, in the octave division unit 51-1, a high-frequency component is further extracted from the downsampled low-frequency component and then downsampled to one-half the sampling frequency. The downsampled results are then supplied to the BPFB 33-1 as the audio signal for the octave O1.

Figure 12:
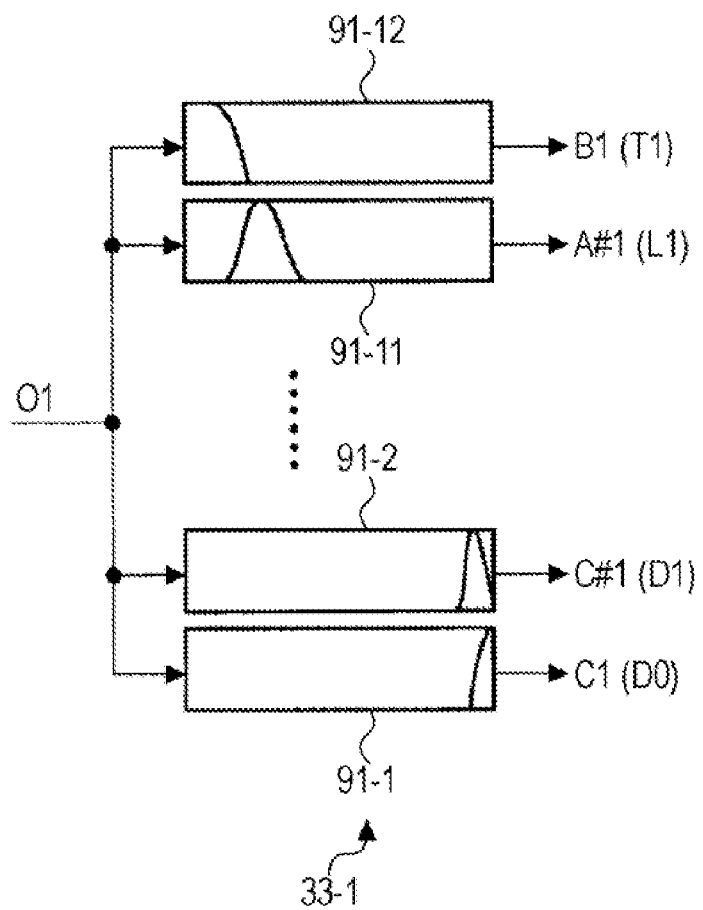
FIG. 12 is a block diagram illustrating an exemplary configuration of the band-pass filtering blocks shown in FIG. 7.
Figure 13:
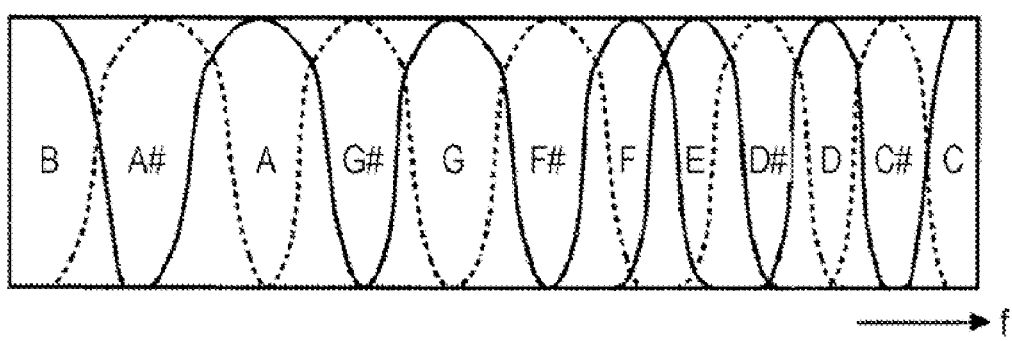
FIG. 13 is a diagram illustrating the frequency characteristics of the band-pass filter shown in FIG. 12.

An exemplary configuration of the BPFBs 33-1 to 33-6 will now be described in detail with reference to FIGS. 12 and 13. FIG. 12 shows an exemplary configuration of the BPFB 33-1.

The BPFB 33-1 is made up of band-pass filters (hereinafter, BPFs) 91-1 to 91-12 respectively having passbands corresponding to the respective frequency ranges of the 12 pitches C1 to B1. The BPFs 91-1 to 91-12 are configured to respectively extract the 12 pitches C1 to B1 from the audio signal for the octave O1 received as input from the octave division block 32.

However, as shown in FIG. 11, the audio signal for a single octave that is received as input from the octave division block 32 has pitches arranged in reverse order on the frequency axis. For this reason, the frequency characteristics of the BPFs 91-1 to 91-12 have been designed as shown in FIG. 13.

More specifically, the BPF 91-1 has characteristics such that an audio signal for the pitch C1 is extracted from the audio signal for the octave O1 that is received as input from the octave division unit 51-1 of the octave division block 32. The BPF 91-2 has characteristics such that an audio signal for the pitch C#1 is extracted from the audio signal for the octave O1. Similarly, the BPFs 91-3 to 91-12 have characteristics such that audio signals for the pitches D1 to B1 are respectively extracted.

The BPFBs 33-2 to 33-6 are configured similarly to the BPFB 33-1. However, the frequency characteristics of the 12 BPFs that constitute each of the BPFBs 33-2 to 33-6 naturally differ from the frequency characteristics of the BPFs 91-1 to 91-12 that constitute the BPFB 33-1.

Figure 14:
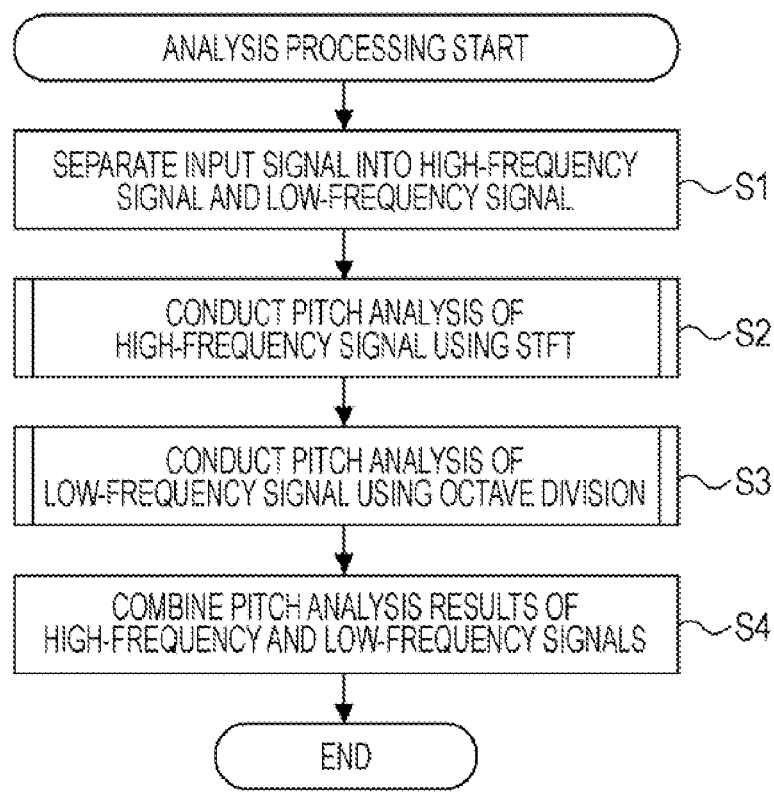
FIG. 14 is a flowchart for explaining the analysis processing of an audio signal analyzing device.

The analysis processing conducted by the audio signal analyzing device 10 will now be described with reference to the flowchart in FIG. 14.

An audio signal to be analyzed is first input into the audio signal analyzing device 10. When the audio signal is supplied to the high-pass filter 11 and the low-pass filter 12 of the audio signal analyzing device 10 in step S1, the high-pass filter 11 extracts a high-frequency signal from the input audio signal and supplies the extracted high-frequency signal to the high-frequency processor 13. The low-pass filter 12 extracts a low-frequency signal from the input audio signal and supplies the extracted low-frequency signal to the low-frequency processor 14.

In step S2, the high-frequency processor 13 subjects the high-frequency signal supplied from the high-pass filter 11 to musical pitch analysis using the STFT technique, with the results of the musical pitch analysis being output to the synthesizing unit 15.

Figure 15:
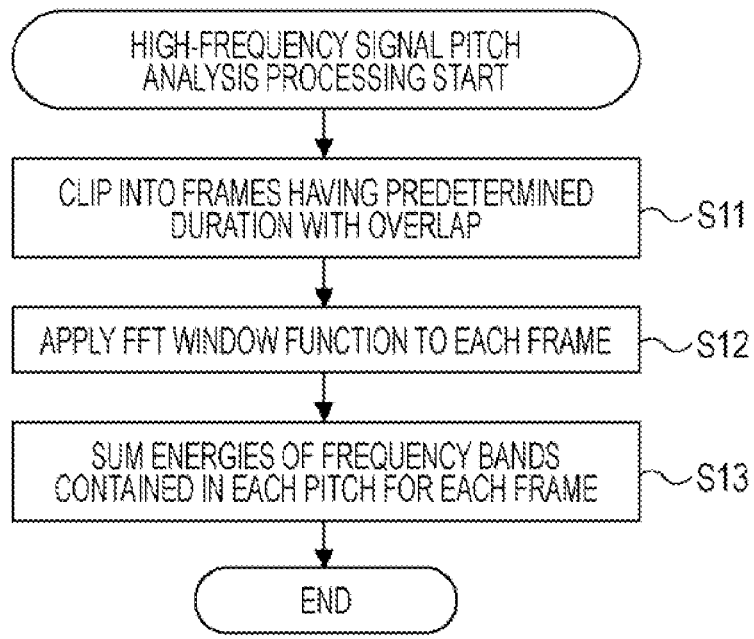
FIG. 15 is a flowchart for explaining the processing in step S2 of FIG. 14.

The details of the processing conducted in step S2 by the high-frequency processor 13 (i.e., the high-frequency signal musical pitch analysis processing) will now be described with reference to the flowchart in FIG. 15.

In step S11, the STFT unit 21 of the high-frequency processor 13 divides the high-frequency signal supplied from the high-pass filter 11 into a plurality of partially overlapping frames having a predetermined duration. In step S12, the STFT unit 21 applies first a window function and then a fast Fourier transform (FFT) to the high-frequency signal in each frame. The respective energies of the equally-spaced frequency bands in the high-frequency signal for each frame that are obtained from the results of the above are then output to the energy summing unit 22.

In step S13, the energy summing unit 22 computes the energy of each pitch by summing the energies of the frequency bands contained in a given pitch on the basis of the output from the STFT unit 21. The summed energies are then output to the synthesizing unit 15 as the musical pitch analysis results of the high-frequency signal. This concludes the description of the high-frequency signal musical pitch analysis processing conducted by the high-frequency processor 13.

Returning to FIG. 14, in step S3, the low-frequency processor 14 subjects the low-frequency signal supplied from the low-pass filter 12 to musical pitch analysis using the octave division technique, with the musical pitch analysis results being output to the synthesizing unit 15.

Figure 16:
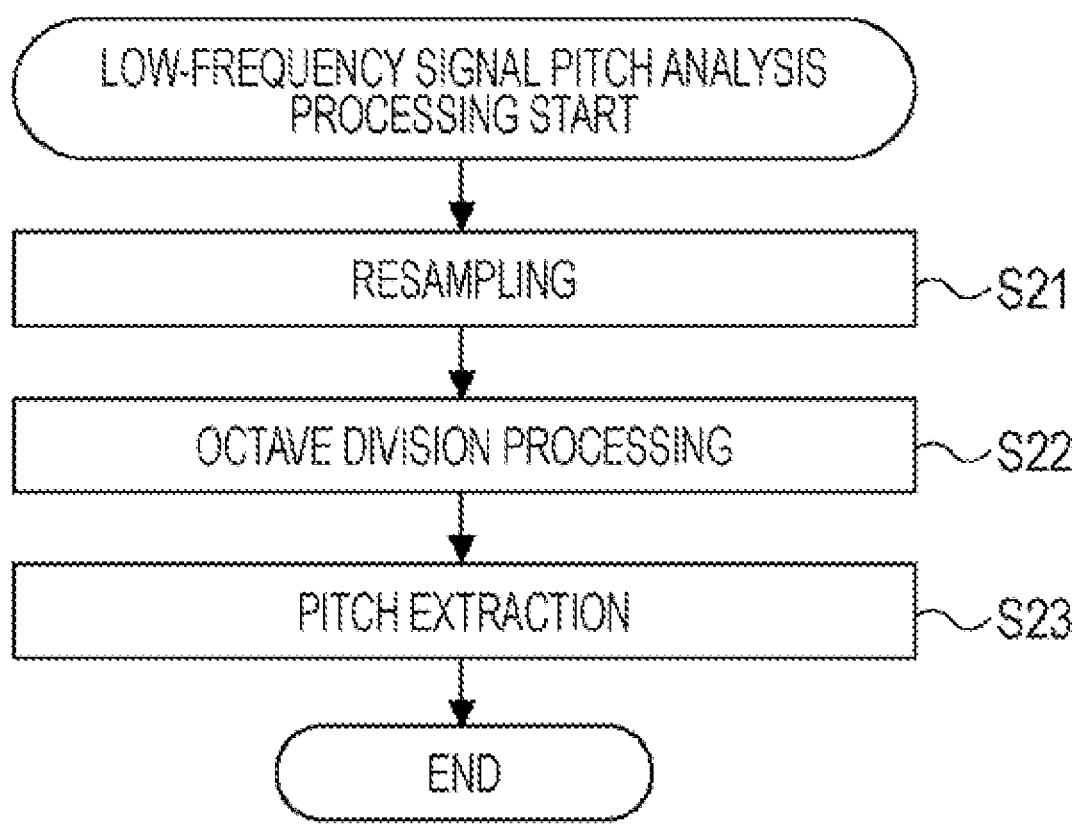
FIG. 16 is a flowchart for explaining the processing in step S3 of FIG. 14.

The details of the processing conducted in step S3 by the low-frequency processor 14 (i.e., the low-frequency signal musical pitch analysis processing) will now be described with reference to the flowchart in FIG. 16.

In step S21, the resampling unit 31 of the low-frequency processor 14 resamples the low-frequency signal supplied from the low-pass filter 12 at a predetermined sampling frequency (32534.7 Hz, for example). The resampled low-frequency signal is then supplied to the octave division block 32.

In step S22, the octave division block 32 divides the resampled low-frequency signal supplied from the resampling unit 31 into respective frequency components for the octaves O1 to O6. The divided frequency components for the octaves O1 to O6 are then respectively output to corresponding BPFBs 33-1 to 33-6.

In step S23, the BPFBs 33-1 to 33-6 respectively extract audio signals for the 12 pitches from C to B by filtering an audio signal for a single octave received as input from the octave division block 32. The audio signals for the various pitches are then output to the synthesizing unit 15 as the musical pitch analysis results of the low-frequency signal. This concludes the description of the low-frequency signal musical pitch analysis processing conducted by the low-frequency processor 14.

Returning to FIG. 14, it should be appreciated that the processing conducted in the steps S2 and S3 as described above may also be executed in reverse order, or in parallel.

In step S4, the synthesizing unit 15 combines the musical pitch analysis results obtained by the high-frequency processor 13 with the musical pitch analysis results obtained by the low-frequency processor 14, and outputs the combined results as the analysis results of the audio signal that was input into the audio signal analyzing device 10. This concludes the description of the analysis processing conducted by the audio signal analyzing device 10.

As described in the foregoing, according to the audio signal analyzing device 10, differing musical pitch analysis techniques are respectively applied to the higher frequencies and the lower frequencies of an audio signal, and thus the audio signal is efficiently analyzed for pitch.

More particularly, by analyzing the higher frequencies of an audio signal using the STFT technique, analysis results are obtained with reduced computational complexity compared to the case wherein the higher frequencies are analyzed using octave division techniques.

Moreover, since STFT processing results are obtained from the high-frequency processor 13 as a byproduct, these STFT processing results may be used for musical analysis or other purposes.

The foregoing series of processes may be executed by means of hardware or software. If the series of processes is executed in software, then a program constituting the software may be read from a program recording medium by a computer built into specialized hardware. Alternatively, the program may be installed from the program recording medium onto a general-purpose personal computer, for example, the personal computer being capable of executing various functions by installing various programs thereon.

Figure 17:
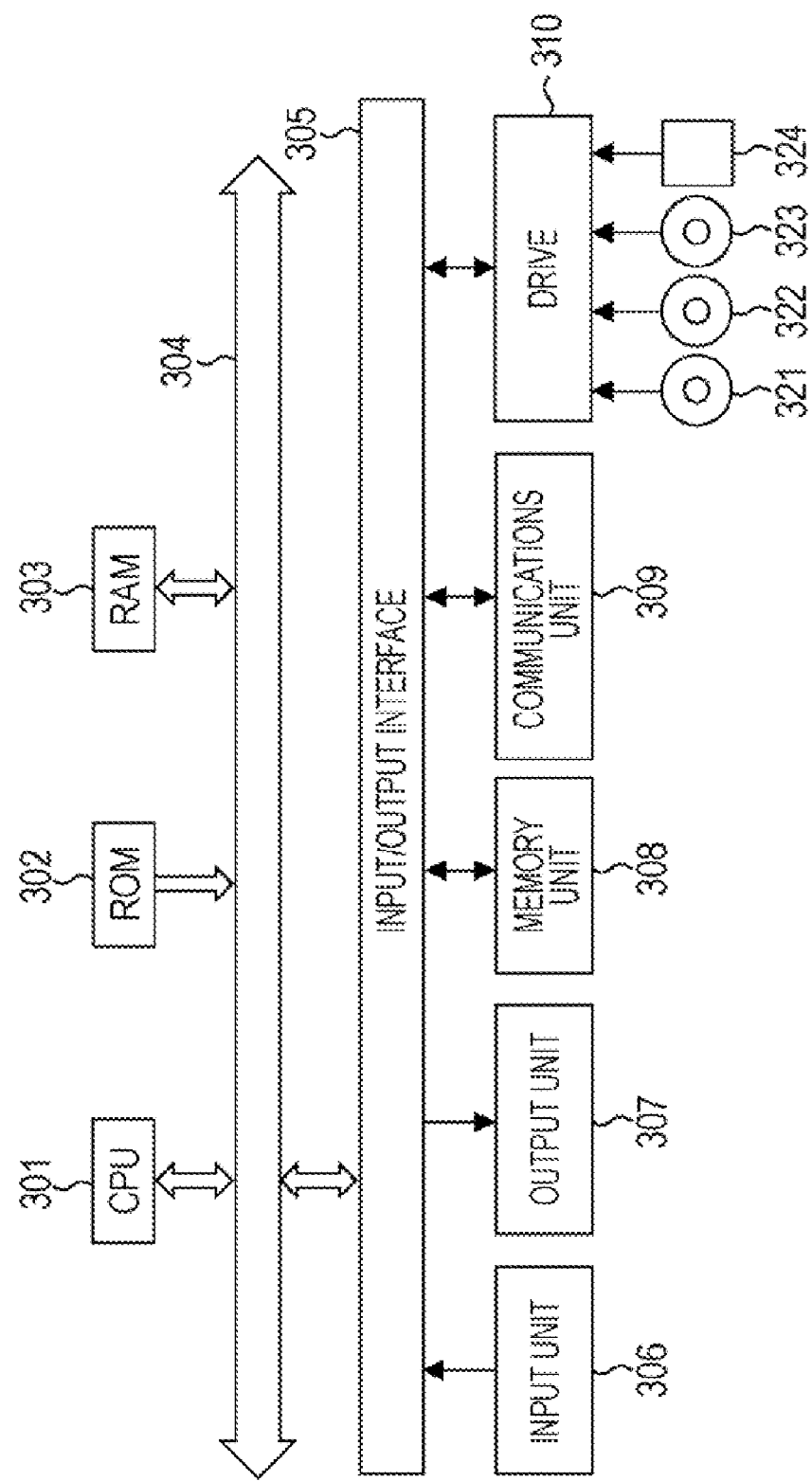
FIG. 17 is a block diagram illustrating an exemplary configuration of a computer.

FIG. 17 is a block diagram illustrating an exemplary hardware configuration of a computer that executes the series of processes described in the foregoing by means of a program.

In the computer, a CPU (central processing unit) 301, ROM (read only memory) 302, and RAM (random access memory) 303 are mutually connected via a bus 304.

The bus 304 is additionally connected to an input/output interface 305. Connected to the input/output interface 305 are: an input unit 306 made up of components such as a keyboard, a mouse, and microphone; an output device 307 made up of components such as a display and speakers; a storage unit 308 made up of components such as a hard disk and non-volatile memory; a communications unit 309 made up of components such as a network interface; and a drive 310 that controls removable media 321 to 324, the removable media being magnetic disks, optical discs, magneto-optical disks, or semiconductor memory.

In the computer configured as described above, the series of processes described above may be conducted as a result of the CPU 301 loading a program stored in the storage unit 308 into the RAM 303 via the input/output interface 305 and the bus 304, and subsequently executing the program, for example.

It should be appreciated that the program executed by the computer may be written such that the processes are conducted in a time-series following the order described in the present specification, such that the processes are conducted in parallel, or such that the processes are called and executed in accordance with suitable timings.

Furthermore, the program may be written so as to be processed by a single computer, or processed in a distributed manner by a plurality of computers. The program may also be written so as to be forwarded to a distant computer and executed.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus that analyzes an audio signal, comprising:
   first extracting means for extracting a high-frequency signal containing the higher frequencies from an input audio signal;
   second extracting means for extracting a low-frequency signal containing the lower frequencies from an input audio signal;
   high-frequency processing means for analyzing the plurality of pitch components contained in the high-frequency signal that was extracted from the audio signal, wherein the high-frequency signal is divided into a plurality of partially overlapping frames, the analysis being conducted using the short-time Fourier transform to apply a window function to each of the high-frequency signal frames and to apply a fast Fourier transform to each of the high-frequency signal frames for the analysis of the plurality of pitch components;
   low-frequency processing means for analyzing the plurality of pitch components contained in the low-frequency signal that was extracted from the audio signal, the analysis being conducted by first dividing the low-frequency signal into a plurality of octave components and then respectively extracting a plurality of pitch components from each octave component; and
   synthesizing means for combining the plurality of pitch components contained in the analyzed high-frequency signal with the plurality of pitch components contained in the analyzed low-frequency signal.

2. The signal processing apparatus according to claim 1, wherein the high-frequency processing means is configured to include
   STFT (short-time Fourier transform) means for acquiring equally-spaced frequency band components by analyzing the high-frequency signal extracted from the audio signal using the short-time Fourier transform, and
   summing means for analyzing the plurality of pitch components contained in the divided high-frequency signal by summing the energies of the plurality of frequency bands that constitute a respective pitch.

3. The signal processing apparatus according to claim 1, wherein the low-frequency processing means is configured to include
   octave division means for dividing the low-frequency signal extracted from the audio signal into a plurality of octave components by repeatedly dividing the low-frequency signal extracted from the audio signal further into a high-frequency component containing the higher frequencies and a low-frequency component containing the lower frequencies thereof, and then respectively downsampling the high-frequency component and the low-frequency component, and
   filtering means for extracting a plurality of pitch components by respectively filtering each octave component in the plurality of octave components.

4. The signal processing apparatus according to claim 3, wherein the low-frequency processing means is configured to further include
   resampling means for resampling the low-frequency signal extracted from the audio signal.

5. A signal processing method for use in a signal processing apparatus that analyzes an audio signal, and comprising the steps of:
   extracting a high-frequency signal containing the higher frequencies from an input audio signal;
   dividing the high-frequency signal into a plurality of partially overlapping frames;
   applying a window function to each of the plurality of the high-frequency signal frames;
   applying a fast Fourier transform to each of the high-frequency signal frames for the analysis of the audio signal;
   extracting a low-frequency signal containing the lower frequencies from an input audio signal;
   analyzing the plurality of pitch components contained in the high-frequency signal that was extracted from the audio signal, the analysis being conducted using the short-time Fourier transform;
   analyzing the plurality of pitch components contained in the low-frequency signal that was extracted from the audio signal, the analysis being conducted by first dividing the low-frequency signal into a plurality of octave components, and then respectively extracting a plurality of pitch components from each octave component; and combining the plurality of pitch components contained in the analyzed high-frequency signal with the plurality of pitch components contained in the analyzed low-frequency signal.

6. A non-transitory computer-readable medium containing program instructions for controlling a signal processing apparatus that analyzes an audio signal, the program instructions causing a computer of the signal processing apparatus to execute processing comprising:

extracting a high-frequency signal containing the higher frequencies from an input audio signal;

dividing the high-frequency signal into a plurality of partially overlapping frames;

applying a window function to each of the plurality of the high-frequency signal frames;

applying a fast Fourier transform to each of the high-frequency signal frames for the analysis of the audio signal;

extracting a low-frequency signal containing the lower frequencies from an input audio signal;

analyzing the plurality of pitch components contained in the high-frequency signal that was extracted from the audio signal, the analysis being conducted using the short-time Fourier transform;

analyzing the plurality of pitch components contained in the low-frequency signal that was extracted from the audio signal, the analysis being conducted by first dividing the low-frequency signal into a plurality of octave components, and then respectively extracting a plurality of pitch components from each octave component; and combining the plurality of pitch components contained in the analyzed high-frequency signal with the plurality of pitch components contained in the analyzed low-frequency signal.

7. A signal processing apparatus that analyzes an audio signal, comprising:

a first extractor configured to extract a high-frequency signal containing the higher frequencies from an input audio signal;

a second extractor configured to extract a low-frequency signal containing the lower frequencies from an input audio signal;

a high-frequency processor configured to analyze the plurality of pitch components contained in the high-frequency signal that was extracted from the audio signal, wherein the high-frequency signal is divided into a plurality of partially overlapping frames, the analysis being conducted using the short-time Fourier transform, to apply a window function to each of the high-frequency signal frames and to apply a fast Fourier transform to each of the high-frequency signal frames for the analysis of the plurality of pitch components;

a low-frequency processor configured to analyze the plurality of pitch components contained in the low-frequency signal that was extracted from the audio signal, the analysis being conducted by first dividing the low-frequency signal into a plurality of octave components and then respectively extracting a plurality of pitch components from each octave component; and a synthesizing unit configured to combine the plurality of pitch components contained in the analyzed high-frequency signal with the plurality of pitch components contained in the analyzed low-frequency signal.

8. The signal processing method according to claim 5, wherein analyzing the plurality of pitch components contained in the high-frequency signal that was extracted from the audio signal includes using STFT (short-time Fourier transform) for acquiring equally-spaced frequency band components by analyzing the high-frequency signal extracted from the audio signal using the STFT, and summing the plurality of pitch components contained in the divided high-frequency signal by summing the energies of the plurality of frequency bands that constitute a respective pitch.

9. The signal processing method according to claim 5, wherein analyzing the plurality of pitch components contained in the low-frequency signal that was extracted from the audio signal includes octave division for dividing the low-frequency signal extracted from the audio signal into a plurality of octave components by repeatedly dividing the low-frequency signal extracted from the audio signal further into a high-frequency component containing the higher frequencies and a low-frequency component containing the lower frequencies thereof, and then respectively downsampling the high-frequency component and the low-frequency component, and filtering for extracting a plurality of pitch components by respectively filtering each octave component in the plurality of octave components.

10. The signal processing method according to claim 9, wherein analyzing the plurality of pitch components contained in the low-frequency signal that was extracted from the audio signal includes resampling for resampling the low-frequency signal extracted from the audio signal.

11. The computer-readable medium containing program instructions of claim 6, wherein analyzing the plurality of pitch components contained in the high-frequency signal that was extracted from the audio signal includes using STFT (short-time Fourier transform) for acquiring equally-spaced frequency band components by analyzing the high-frequency signal extracted from the audio signal using the STFT, and summing for analyzing the plurality of pitch components contained in the divided high-frequency signal by summing the energies of the plurality of frequency bands that constitute a respective pitch.

12. The computer-readable medium containing program instructions of claim 6, wherein analyzing the plurality of pitch components contained in the low-frequency signal that was extracted from the audio signal includes octave division for dividing the low-frequency signal extracted from the audio signal into a plurality of octave components by repeatedly dividing the low-frequency signal extracted from the audio signal further into a high-frequency component containing the higher frequencies and a low-frequency component containing the lower frequencies thereof, and then respectively downsampling the high-frequency component and the low-frequency component, and filtering for extracting a plurality of pitch components by respectively filtering each octave component in the plurality of octave components.

13. The computer-readable medium containing program instructions of claim 12, wherein analyzing the plurality of pitch components contained in the low-frequency signal that was extracted from the audio signal includes resampling for resampling the low-frequency signal extracted from the audio signal.

14. The signal processing apparatus of claim 7, wherein the high-frequency processor is configured to use STFT (short-time Fourier transform) for acquiring equally-spaced frequency band components by analyzing the high-frequency signal extracted from the audio signal using the STFT, and the apparatus further comprising a summer for analyzing the plurality of pitch components contained in the divided high-frequency signal by summing the energies of the plurality of frequency bands that constitute a respective pitch.

15. The signal processing apparatus of claim 7, wherein the low-frequency processor is configured to perform octave division for dividing the low-frequency signal extracted from the audio signal into a plurality of octave components by repeatedly dividing the low-frequency signal extracted from the audio signal further into a high-frequency component containing the higher frequencies and a low-frequency component containing the lower frequencies thereof, and then respectively downsampling the high-frequency component and the low-frequency component, and the apparatus further comprising a filter for extracting a plurality of pitch components by respectively filtering each octave component in the plurality of octave components.

16. The signal processing apparatus of claim 15, wherein the low-frequency processor is configured to resample for resampling the low-frequency signal extracted from the audio signal.

17. The signal processing apparatus according to claim 1, wherein either or both of the first extracting means or the second extracting means extracts frequency signal bands according to a desired analysis precision.

18. The signal processing method according to claim 5, wherein either or both of extracting a high-frequency signal or low-frequency signal extracts frequency signal bands according to a desired analysis precision.

19. The computer-readable medium containing program instructions of claim 6, wherein either or both of extracting a high-frequency signal or low-frequency signal extracts frequency signal bands according to a desired analysis precision.

20. The signal processing apparatus of claim 7, wherein either or both of the first extractor or second extractor extracts frequency signal bands according to a desired analysis precision.

* * * * *